United States Patent
Lane et al.

(10) Patent No.: US 12,304,667 B1
(45) Date of Patent: May 20, 2025

(54) TUBULAR SUPPORT ELEMENT

(71) Applicant: NORTHROP GRUMMAN SYSTEMS CORPORATION, Falls Church, VA (US)

(72) Inventors: Chesley Lane, Hawthorne, CA (US); Steven J. Floyd, Monterey Park, CA (US); Talbot P. Thrasher, Coatesville, PA (US); Timothy R. Stone, Torrance, CA (US); Vernon M. Benson, Morgan, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 313 days.

(21) Appl. No.: 18/162,194

(22) Filed: Jan. 31, 2023

(51) Int. Cl.
*B33Y 80/00* (2015.01)
*B33Y 70/00* (2020.01)
*B64G 1/66* (2006.01)

(52) U.S. Cl.
CPC ............... *B64G 1/66* (2013.01); *B33Y 70/00* (2014.12); *B33Y 80/00* (2014.12)

(58) Field of Classification Search
CPC ........ B64G 1/66; B64G 1/222; B64G 1/2226; B64G 1/44; E04C 3/005; E04H 12/182; H01Q 11/08; H01Q 11/083; H01Q 11/086; F16B 7/044; F16B 7/0406; F16B 7/0446; F16B 5/0692; F16B 7/042; F16B 7/0453; F16B 7/0473; F16B 7/048; F16B 7/0486; F16B 7/0413; F16B 7/0426
See application file for complete search history.

(56) References Cited

U.S. PATENT DOCUMENTS

| | | | |
|---|---|---|---|
| 1,051,427 A * | 1/1913 | McCluskey | F16L 37/0925 |
| | | | 403/292 |
| 6,443,352 B1 | 9/2002 | White | |
| 6,457,629 B1 | 10/2002 | White | |
| 6,463,349 B2 | 10/2002 | White et al. | |
| 6,519,500 B1 | 2/2003 | White | |
| 6,685,365 B2 | 2/2004 | White | |
| 6,814,823 B1 | 11/2004 | White | |

(Continued)

FOREIGN PATENT DOCUMENTS

| | | | | |
|---|---|---|---|---|
| EP | 1593597 A1 * | 11/2005 | ............. | B64G 1/222 |
| EP | 4130412 A1 * | 2/2023 | ............. | E04H 17/08 |

(Continued)

*Primary Examiner* — Theodore V Adamos
(74) *Attorney, Agent, or Firm* — John A. Miller; Shumaker, Loop & Kendrick, LLP

(57) ABSTRACT

A tube element including a first set of spaced apart tape strips helically wound in one direction, and a second set of spaced apart tape strips helically wound in an opposite direction as the first set of tape strips so that the tape strips in the first set periodically cross the tape strips in the second set, where the first and second sets of tape strips define a tube. A set of spaced apart straight tape strips are provided along the length of the tube. An end fitting is secured to an end of the first and second sets of tape strips at one end of the tube, and another end fitting is secured to an end of the first and second sets of tape strips at an opposite end of the tube, where the fittings are configured to be coupled to an end fitting of another tube element.

17 Claims, 5 Drawing Sheets

(56) References Cited

U.S. PATENT DOCUMENTS

| | | | | |
|---|---|---|---|---|
| 7,186,050 | B2 * | 3/2007 | Dean | F16B 7/0413 |
| | | | | 403/379.6 |
| 7,941,978 | B1 * | 5/2011 | Pollard | H01Q 15/161 |
| | | | | 52/645 |
| 10,508,005 | B2 * | 12/2019 | Spronken | E04B 1/19 |
| 2006/0272265 | A1 * | 12/2006 | Pryor | E04C 3/005 |
| | | | | 52/645 |
| 2010/0065192 | A1 * | 3/2010 | Wilson | G06F 3/042 |
| | | | | 156/180 |
| 2011/0281082 | A1 * | 11/2011 | Wilson | B29C 66/61 |
| | | | | 428/178 |
| 2014/0182232 | A1 * | 7/2014 | Holt | F03D 13/20 |
| | | | | 52/645 |
| 2014/0232611 | A1 * | 8/2014 | Ochoa | H01Q 11/086 |
| | | | | 343/881 |

FOREIGN PATENT DOCUMENTS

| | | | | |
|---|---|---|---|---|
| GB | 2294312 A | * | 4/1996 | ............ F21V 21/116 |
| KR | 101544840 B1 | * | 8/2015 | |
| WO | WO-2019162712 A1 | * | 8/2019 | ............ E04B 1/2403 |

* cited by examiner

TUBULAR SUPPORT ELEMENT

BACKGROUND

Field

This disclosure relates generally to a tube element including spaced apart tape strips and, more particularly, to a tube element including spaced apart tape strips, where the tube element can be one tube element of many tube elements in a support structure for supporting a spacecraft component.

Discussion of the Related Art

It has been proposed in the art to manufacture spacecraft parts, and even spacecraft themselves, in space or on-orbit. Spacecraft parts that are manufactured on-orbit or in space do not require the strong structures required by spacecraft parts produced and manufactured on Earth to survive launch into space, and thus can be very lightweight. The manufacture of spacecraft parts in space would likely employ additive manufacturing techniques. A typical additive manufacturing technique uses a feedstock material, such as a continuous filament from a spool, provided to a heated nozzle, where it is extruded therefrom as a heated molten filament to be deposited as adjacent rows of strips to form a layer, and where the molten filaments (fiber reinforced or unreinforced) immediately begin to harden once they are extruded from the nozzle. Multiple layers are built up in this manner in a certain configuration to produce a desired part. These filaments may have continuous carbon, or other, fibers that extend from one end of the filament to the other end of the filament and are encapsulated in a suitable polymer, such as a thermoplastic, to provide the desired matrix strength. Additionally, the carbon fibers can be chopped or sectioned so that they are not continuous from one end of the filament to the other end of the filament, and are also impregnated/held together with a suitable matrix.

Tube elements are employed as truss structures in a variety of large spacecraft components, such as antennas, telescopes, solar arrays, etc., as building block elements for those structures. The current state of the art for in-space manufacturing of tube elements includes planned NASA missions to manufacture polymer tubes for on-orbit servicing, assembly and manufacturing (OSAM) missions. These tube elements do not contain continuous fiber reinforcement and hence have low stiffness and a high coefficient of thermal expansion. These OSAM manufacturing approaches also manufacture components layer-by-layer, which is an inherently slow process. Tube elements from these state of the art manufacturing approaches cannot provide the stiffness and stability required for super structures, and manufacturing the thousands of meters of tube would require years of on-orbit construction with a single machine or hundreds of machines. Other on-orbit construction technology concepts are known in the art, but are limited by tooling constraints (scalability), speed, mass and/or thermal expansion.

SUMMARY

The following discussion discloses and describes a tube element including a first set of spaced apart tape strips helically wound in one direction, and a second set of spaced apart tape strips helically wound in an opposite direction as the first set of tape strips so that the tape strips in the first set of tape strips periodically cross the tape strips in the second set of tape strips, where the first and second sets of tape strips define a tube. A set of spaced apart straight tape strips are provided along the length of the tube. An end fitting is secured to an end of the first and second sets of tape strips at one end of the tube, and another end fitting is secured to an end of the first and second sets of tape strips at an opposite end of the tube, where the fittings are configured to be coupled to an end fitting of another tube element.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a tube element including spaced apart tape strips is merely exemplary in nature, and is in no way intended to limit the disclosure or its applications or uses. For example, the tube element is described herein as one tube element of many tube elements in a support structure for supporting a spacecraft component. However, the tube element may have other applications.

As will be discussed in detail below, this disclosure proposes a structural tube element fabricator (STEF) manufacturing system that is capable of rapidly producing low-mass truss or tube elements with integral end fittings on-orbit. The system uses continuous carbon fiber thermoplastic feedstock and ultrasonic welding to manufacture the ultra-light structural tube elements. Multiple spools of material create a continuous counter-winding helical lattice wrap through simultaneously winding in two directions along with longitudinal tows fed directly. A rotary mechanism provides ultrasonic spot welding to fuse overlaps in material tows, resulting in short or very long tube elements as desired, where the tube elements can be manufactured in approximately 30-60 seconds per meter.

Figure 1:
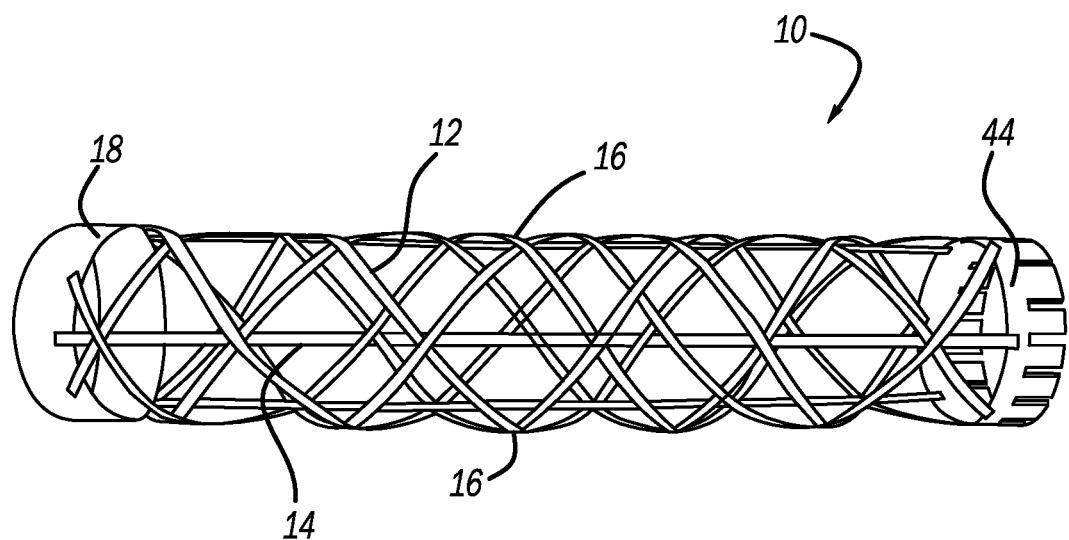
FIG. 1 is an isometric view of a tube element.

FIG. 1 is an isometric view of a tube element 10 that has been manufactured by a process and machine of the type referred to above and that will discussed in detail below. The tube element 10 includes a number of helically wound tape strips 12 made of a thermoplastic material including continuous glass or carbon fibers. A series of straight tape strips 14 also made of a thermoplastic material including continuous carbon fibers are disposed around the element 10. The strips 12 and 14 cross at a number of locations 16 where they are ultrasonically welded together. One end of the tape strips 12 and 14 are secured or welded to a socket end fitting 18 and the opposite end of the tape strips 12 and 14 are secured or welded to a cup end fitting 44, which will be discussed in detail below. In this non-limiting embodiment, there are three clockwise wrapped tape strips 12, three counter-clockwise wrapped tape strips 12 and three straight tape strips 14 incremented 120° apart. Further, the tube element 10 is 0.80 meters long and has an inner diameter of 10 cm and the tape strips 12 and 14 are about 60 mm wide and 0.25 mm in thickness. However, it is stressed that these parameters are by way of a non-limiting example.

Figure 2:
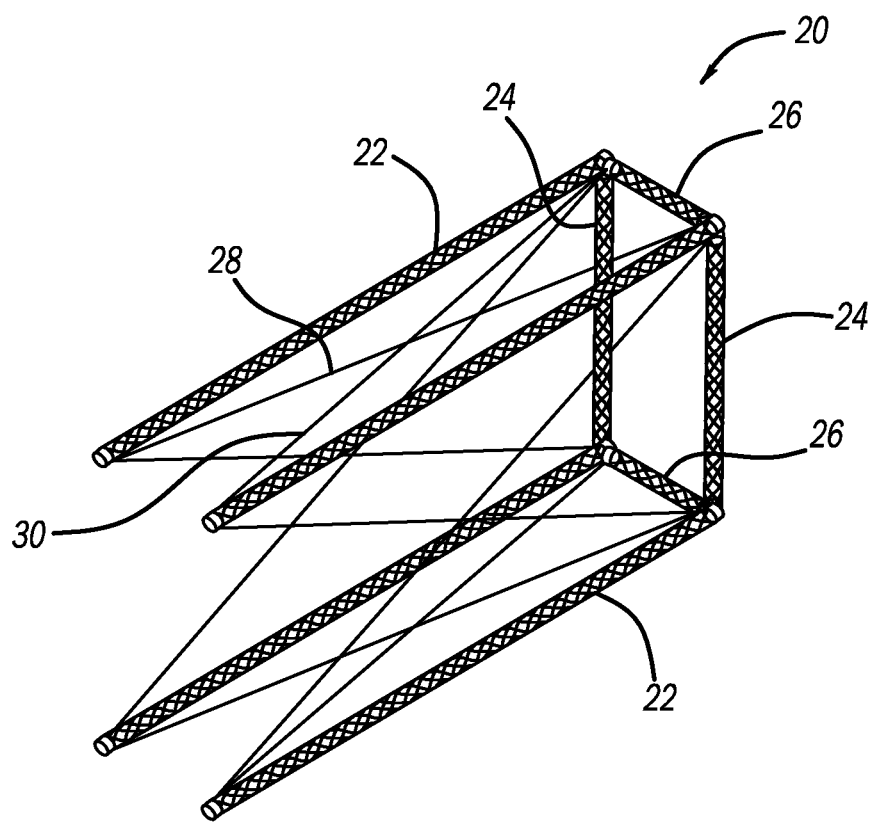
FIG. 2 is an isometric view of a box structure made up of eight of the tube elements shown in FIG. 1.

The end fittings 18 can be configured to adequately secure several of the tube elements 10 together to form, for example, box structures that then are attached to together to form large structures. FIG. 2 is an isometric view of an exemplary box structure 20 including eight of the tube elements 10, specifically four long longitudinal tube elements 22, two end tube elements 24 of one length and two end tube elements 26 of a shorter length, where the tube elements 24 and 26 define a rectangle. Two cross bars 28 and 30 provide support for each pair of adjacent longitudinal tube elements 22, as shown.

Figure 3:
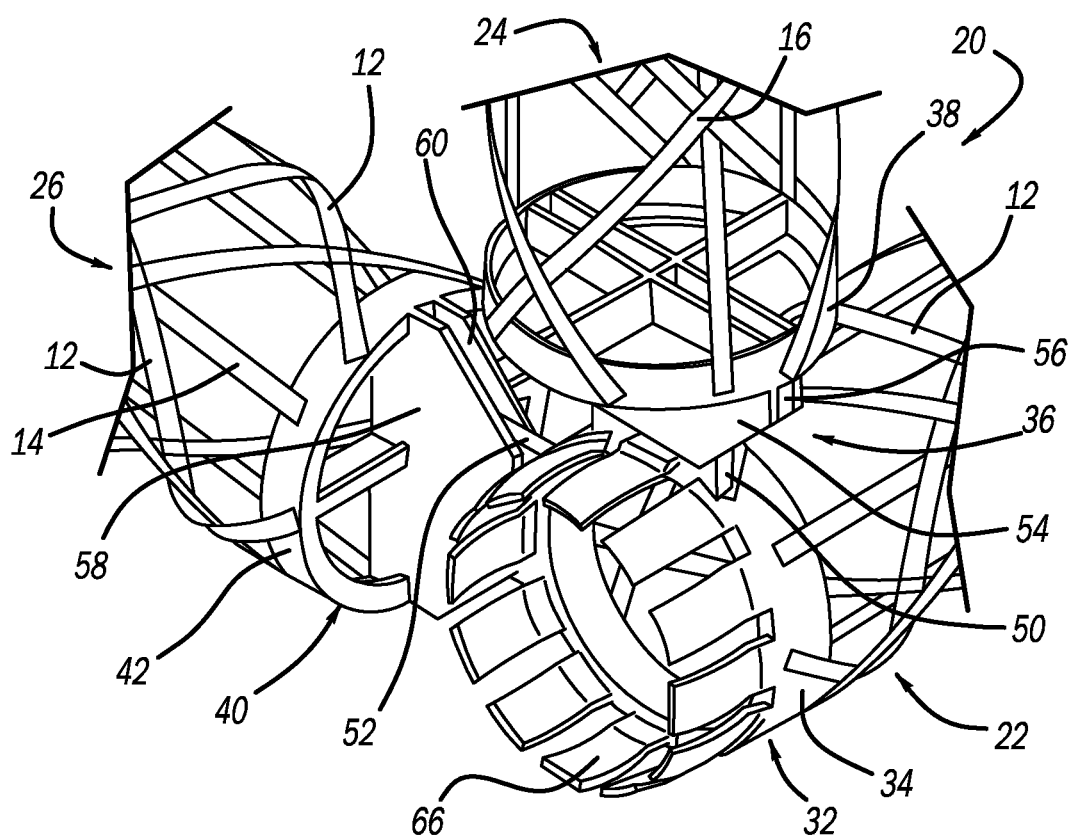
FIG. 3 is a broken-away isometric view of the box structure shown in FIG. 2 illustrating a corner connection between the tube elements.
Figure 4:
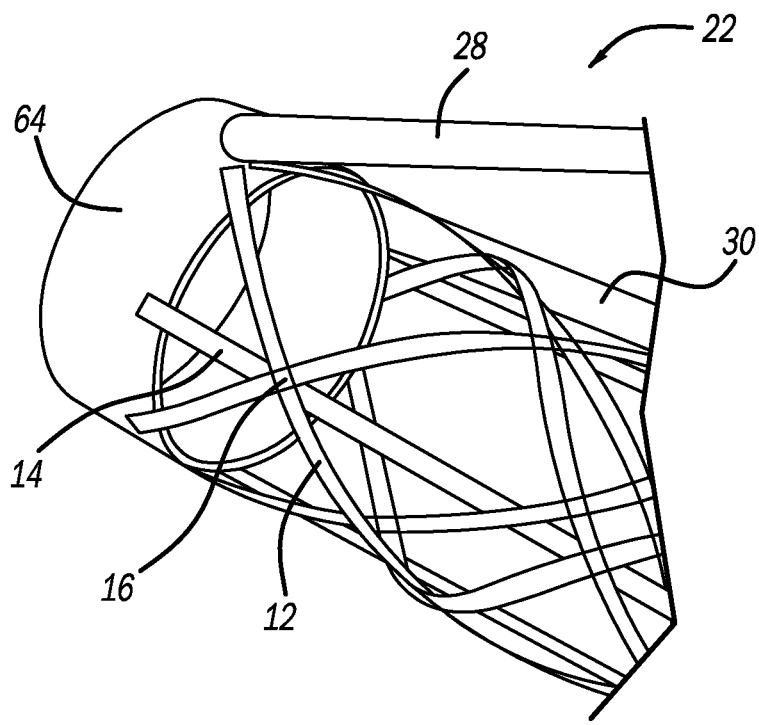
FIG. 4 is a broken-away isometric view of one of the tube elements in the box structure in FIG. 2 including a cup end fitting.

The end fittings that allow the tube elements 22, 24 and 26 to be secured together may have various configurations. FIG. 3 is a broken-away isometric view of the box structure 20 showing how an end of one of the tube elements 22, one of the tube elements 24 and one of the tube elements 26 are joined as one example. Particularly, the tube element 22 includes a socket end fitting 32 having a ring 34, the tube element 24 includes a clevis end fitting 36 having a ring 38 and the tube element 26 includes a clevis end fitting 40 having a ring 42, where ends of the strips 12 and 14 are ultrasonically welded to the rings 34, 38 and 42. The socket end fitting 32 includes tabs 50 and 52 coupled to the ring 34 at 90° relative to each other, the clevis end fitting 36 includes opposing tabs 54 and 56 coupled to the ring 38 and the clevis end fitting 40 includes opposing tabs 58 and 60 coupled to the ring 42. The tab 50 is positioned between the tabs 54 and 56 and the tab 52 is positioned between the tabs 58 and 60, and ultrasonically welded thereto. As shown in FIG. 4, an opposite end of the longitudinal tube elements 22 includes a cup end fitting 64 that accepts the cross bar 28 or 30. The fitting 32 includes a series of spaced apart flexible tangs 66 concentric with and extending from the ring 34, where the cup end fitting of the same type as the cup end fitting 64 on an adjacent longitudinal tube element can be slid onto the tangs 66 and welded thereto. Opposite ends of the tube elements 24 and 26 would also include clevis end fittings.

Figure 5:
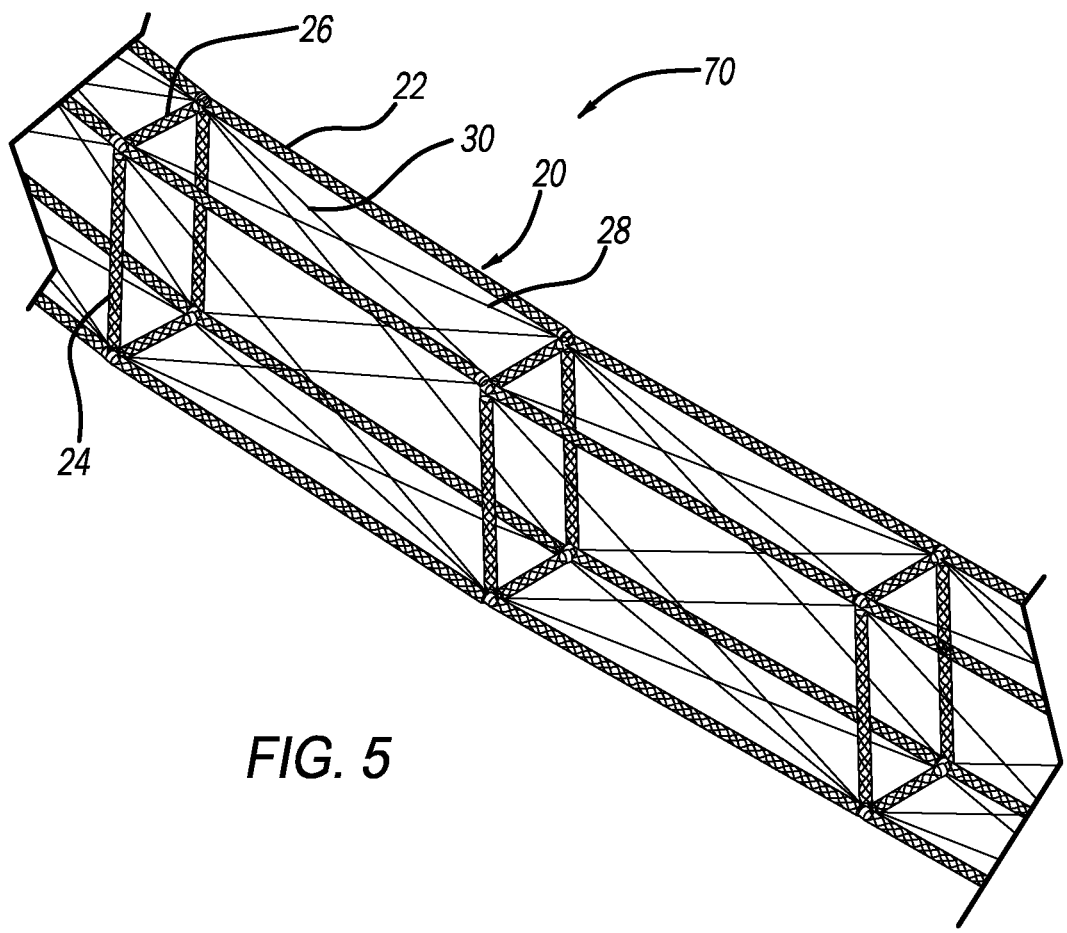
FIG. 5 is a broken-away isometric view of a support structure showing a number of the box structures shown in FIG. 2 coupled together.
Figure 6:
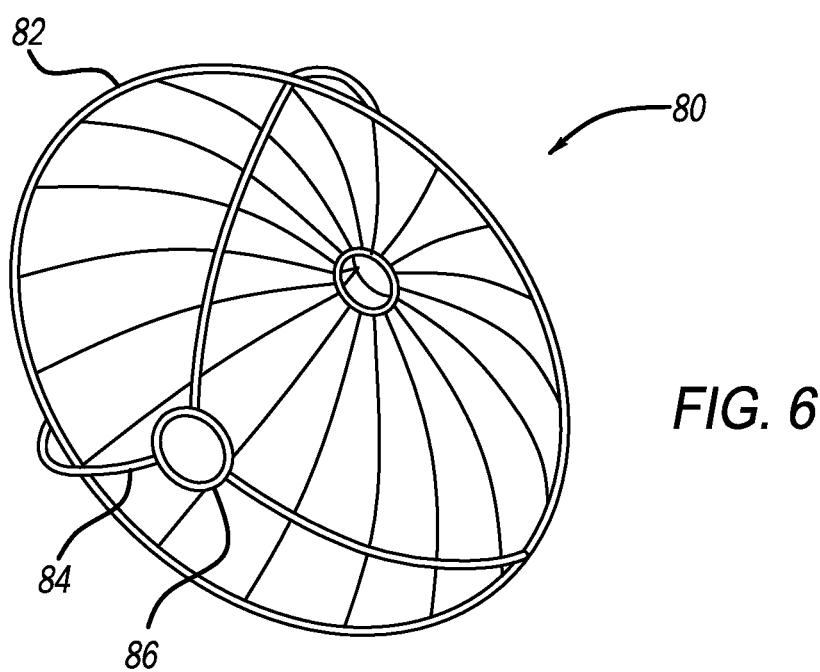
FIG. 6 is an isometric view of an RF antenna that includes a number of the support structures shown in FIG. 5.

Multiple of the box structures 20 are connected together end-to-end by any suitable manner to form the large structure. FIG. 5 is a broken-away isometric view of a support structure 70 showing a number of the box structures 20 coupled together. Multiple support structures 70 are then used to assemble a large spacecraft component. FIG. 6 is an isometric view of an RF antenna 80 showing one example of such a spacecraft component, where an outer ring 82 of the antenna 80 is composed of the support structure 70 and arms 84 that support a transceiver 86 are also composed of the support structure 70.

Figure 7:
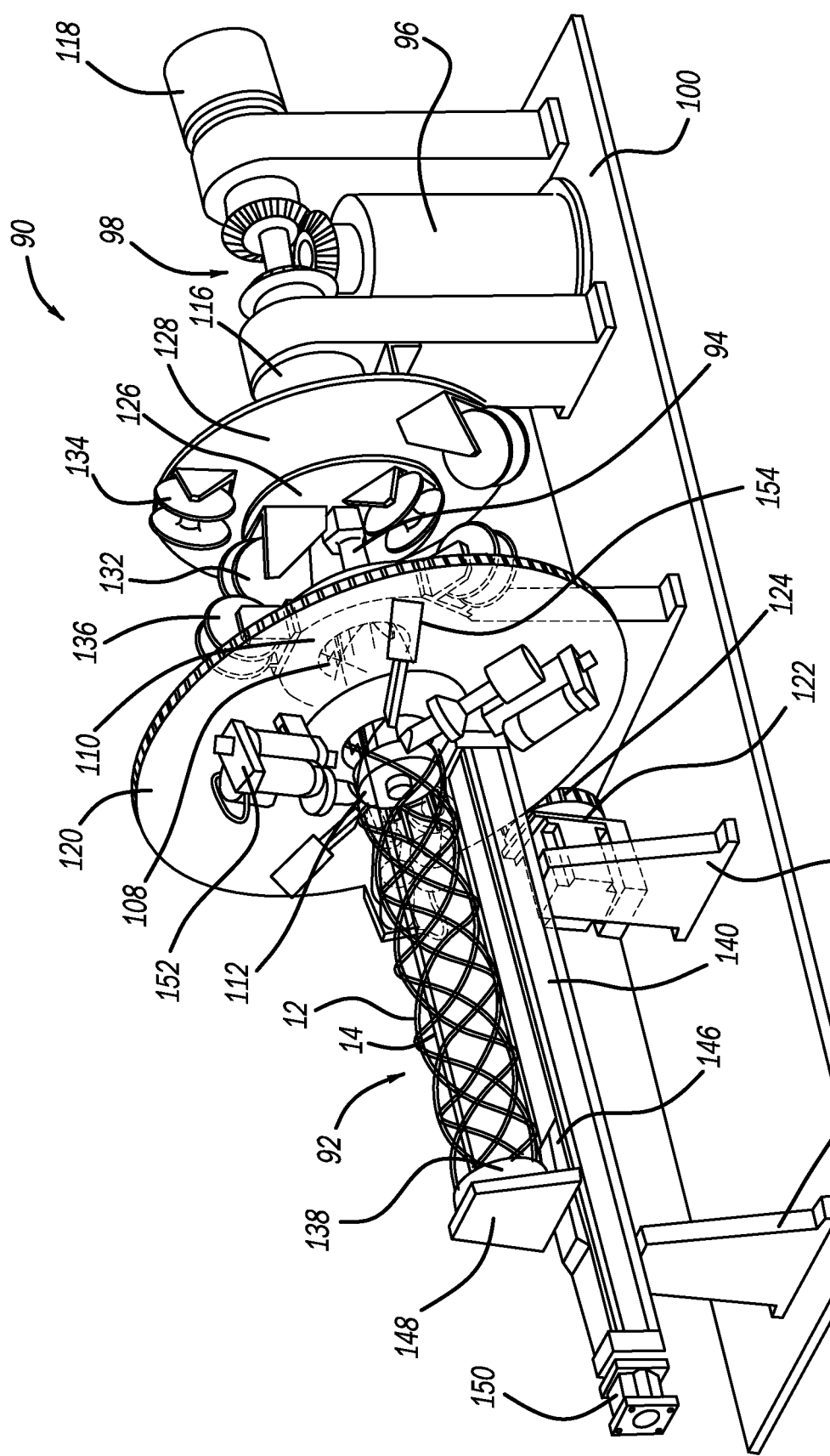
FIG. 7 is an isometric view of an additive manufacturing machine for manufacturing the tube elements.
Figure 8:
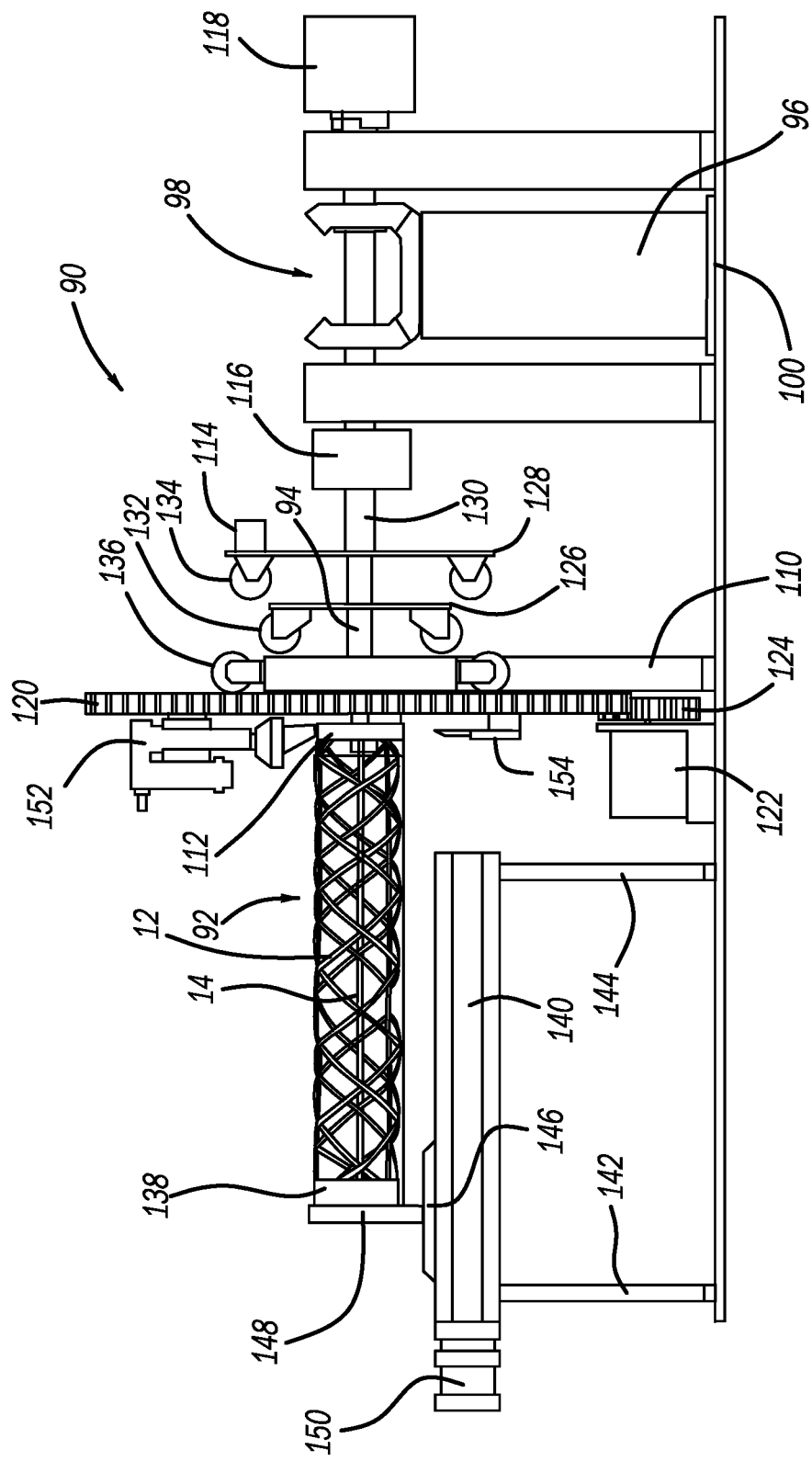
FIG. 8 is a side view of the machine shown in FIG. 7.

As mentioned above, the tube elements 10 are manufactured on-orbit by an additive manufacturing process to produce lightweight and strong elements for assembling the components as discussed above. Various additive manufacturing machines and assemblies can be employed to do that. FIG. 7 is an isometric view and FIG. 8 is a side view of an additive manufacturing machine 90 suitable for this purpose showing a tube element 92 being manufactured, where the tube element 92 includes the tape strips 12 and 14 that make up the tube element 10. The machine 90 includes a shaft 94 that is rotated by a stepper motor 96 through beveled gears 98 at one end, where the motor 96 is mounted to a base plate 100. The shaft 94 extends through an opening 108 in a support member 110 mounted to the base plate 100, where a disk 112 is secured to the shaft 94 at an opposite end from the stepper motor 96 on an opposite side of the support member 110, as shown. A gear plate 120 is mounted to the support member 110 opposite to the stepper motor 96 and adjacent to the disk 112, where a motor 122 and gear 124 rotate the plate 120. A small diameter disk 126 is secured to the shaft 94 and a large diameter disk 128 positioned adjacent to the disk 126 is secured to a concentric shaft 130 so that when the stepper motor 96 operates the beveled gears 98 rotate the disks 126 and 128 in opposite directions. Three equally spaced spools 132 at 120° relative to each other are mounted to the disk 126 facing the support member 110 and three equally spaced spools 134 at 120° relative to each other are mounted to the disk 128 facing the member 110, where one of the tape strips 12 is wound on each of the spools 132 and 134. Three equally spaced spools 136 are mounted on an outer edge of the support member 110, where one of the tape strips 14 is wound on each of the spools 136.

A rail 140 is secured to the support member 110 and mounted to the base plate 100 by stands 142 and 144. A slide 146 is slidably positioned on the rail 140 and an end support 148 is mounted to the slide 146 to which a tube member end fitting 138 is secured. An indexer 150 pulls the slide 146 away from the support member 110 as the tube member 92 is being fabricated. However, the rail 140 limits the length of the tube element 92. Therefore, in an alternate embodiment, the rail 140 is eliminated and instead of using the indexer 150 to pull the slide 146, the spools 132, 134 and 136 can be rotated by a motor to dispense the strips 12 and 14. This embodiment is represented by a motor 114 mounted to the disk 128 for rotating one of the spools 134. Each of the spools 132, 134 and 136 would include its own suitably mounted motor. Slip ring assemblies 116 and 118 are provided to feed the motors. Three welding devices 152 are circumferentially mounted to the plate 120 adjacent to the disk 112 and three cutters 154 are circumferentially mounted to the plate 120 between the welding devices 152 adjacent to the disk 112.

The tapes 12 and 14 are threaded through suitable guides (not shown) and the opening 108 in a proper spaced apart configuration around the disk 112 and are welded to the end fitting 138 secured to the end support 148. The indexer 150 pulls the slide 146 and thus the tapes 12 and 14 off of the spools 132, 134 and 136 and the motor 96 rotates the shaft 94 so that three of the tapes 12 are would around the disk 112 in a spaced apart manner in one helical direction and the other three tapes 12 are wound around the disk 112 in a spaced apart manner in the opposite helical direction. Further, the tapes 14 are drawn straight in a spaced apart manner. At periodic times, the two tapes 12 being wound in opposite directions and the tapes 14 will cross at three locations on the disk 112. At this time, the rotation of the shaft 94 and the indexer 150 stops, and the welding devices 152 are rotated to the proper location by the plate 120 to weld the three tapes 12 and 14 together at the three locations. The rotation of the shaft 94 and the indexing then continues until the next time the tapes 12 and 14 cross and the welding devices 152 weld the three tapes 12 and 14 at the three locations. This continues until the desired length of the tube element 92 is reached, and the cutters 154 cut all of the tapes 12 and 14. The other end fitting is then attached to the tube element 92.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A tube element comprising:
a first plurality of spaced apart tape strips helically wound in one direction;
a second plurality of spaced apart tape strips helically wound in an opposite direction as the first plurality of tape strips so that the tape strips in the first plurality of tape strips periodically cross the tape strips in the second plurality of tape strips, said first and second plurality of tape strips defining a tube;
a first end fitting secured to ends of the first and second plurality of tape strips at one end of the tube, said first end fitting including a ring and first and second tabs extending from the ring 90° apart from each other and being perpendicular to a longitudinal length of the tube element; and
a second end fitting secured to ends of the first and second plurality of tape strips at an opposite end of the tube, said first and second end fittings being configured to be coupled to an end fitting of another tube element, wherein the first end fitting includes a plurality of spaced apart flexible tangs concentric therewith and extending from the ring, said ends of the tape strips being secured to the ring, said flexible tangs being configured to slidably engage a cup end fitting of another tube element so that the tube elements are secured together along the longitudinal length of the tube elements.

2. The tube element according to claim 1 further comprising a plurality of spaced apart straight tape strips extending along the length of the tube and having ends secured to the first and second end fittings, said straight tape strips crossing the location where the tape strips in the first plurality of tape strips and the tape strips in the second plurality of tape strips cross.

3. The tube element according to claim 1 wherein the first plurality of tape strips is three tape strips spaced 120° apart and the second plurality of tape strips is three tape strips spaced 120° apart.

4. The tube element according to claim 3 further comprising three straight tape strips spaced 120° apart extending along the length of the tube and having ends secured to the first and second end fittings, said straight tape strips crossing the location where the tape strips in the first plurality of tape strips and the tape strips in the second plurality of tape strips cross.

5. The tube element according to claim 1 wherein the tape strips are welded together at the locations where the tape strips cross and the ends of the tape strips are welded to the end fittings.

6. The tube element according to claim 1 wherein the first tab is configured to be positioned between and engage opposing tabs of an end fitting of a third tube element and said second tab being configured to be positioned between and engage opposing tabs of an end fitting of a fourth tube element so that the tube elements are secured together in a box configuration.

7. The tube element according to claim 1 wherein ends of the tape strips are secured to the ring.

8. The tube element according to claim 1 wherein the second end fitting includes a ring and a pair of opposing tabs, said ends of the tape strips being secured to the ring.

9. The tube element according to claim 1 wherein the tape strips are made of a thermoplastic matrix including glass or carbon fibers.

10. The tube element according to claim 1 wherein the tube element is part of a support structure that supports a spacecraft component.

11. A tube element comprising:
a first set of three tape strips spaced 120° apart and being helically wound in one direction;
a second set of three tape strips spaced 120° apart and being helically wound in an opposite direction as the first set of tape strips;
a third set of straight tape strips spaced 120° apart and being straight, wherein the tape strips in the first, second and third sets of tape strips define a tube and periodically cross at the same location, and wherein the tape strips are made of a thermoplastic matrix including carbon fibers;
a first end fitting secured to ends of the tape strips in the first, second and third sets of tape strips at one end of the tube, said first end fitting including a ring and first and second tabs extending from the ring 90° apart from each other and being perpendicular to a longitudinal length of the tube element; and
a second end fitting secured to ends of the tape strips in the first, second and third sets of tape strips at an opposite end of the tube, said first and second end fittings being configured to be coupled to an end fitting of another tube element, wherein the first end fitting includes a plurality of spaced apart flexible tangs concentric therewith and extending from the ring, said ends of the tape strips being secured to the ring, said flexible tangs being configured to slidably engage a cup end fitting of another tube element so that the tube elements are secured together along the longitudinal length of the tube elements.

12. The tube element according to claim 11 wherein the tape strips are welded together at the locations where the tape strips cross and the ends of the tape strips are welded to the end fittings.

13. The tube element according to claim 11 wherein the tube element is part of a support structure that supports a spacecraft component.

14. A support structure comprising:
a first tube element including a first plurality of spaced apart tape strips helically wound in one direction, a second plurality of spaced apart tape strips helically wound in an opposite direction as the first plurality of tape strips so that the tape strips in the first plurality of tape strips periodically cross the tape strips in the second plurality of tape strips, said first and second plurality of tape strips defining a first tube, a first end fitting secured to ends of the first and second plurality of tape strips at one end of the first tube, and a second end fitting secured to ends of the first and second plurality of tape strips at an opposite end of the first tube;
a second tube element including a third plurality of spaced apart tape strips helically wound in one direction, a fourth plurality of spaced apart tape strips helically wound in an opposite direction as the third plurality of tape strips so that the tape strips in the third plurality of tape strips periodically cross the tape strips in the fourth plurality of tape strips, said third and fourth plurality of tape strips defining a second tube, a third end fitting secured to ends of the third and fourth plurality of tape strips at one end of the second tube, and a fourth end fitting secured to ends of the third and fourth plurality of tape strips at an opposite end of the second tube, wherein the first end fitting and the third end fitting are coupled together so that the first and second tube elements are positioned at 90° relative to each other;

a third tube element including a fifth plurality of spaced apart tape strips helically wound in one direction, a sixth plurality of spaced apart tape strips helically wound in an opposite direction as the fifth plurality of tape strips so that the tape strips in the fifth plurality of tape strips periodically cross the tape strips in the sixth plurality of tape strips, said fifth and sixth plurality of tape strips defining a third tube, a fifth end fitting secured to ends of the fifth and sixth plurality of tape strips at one end of the third tube, and a sixth end fitting secured to ends of the fifth and sixth plurality of tape strips at an opposite end of the third tube, wherein the first end fitting and the fifth end fitting are coupled together so that the first, second and third tube elements are positioned at 90° relative to each other; and a fourth tube element including a seventh plurality of spaced apart tape strips helically wound in one direction, an eighth plurality of spaced apart tape strips helically wound in an opposite direction as the seventh plurality of tape strips so that the tape strips in the seventh plurality of tape strips periodically cross the tape strips in the eighth plurality of tape strips, said seventh and eighth plurality of tape strips defining a fourth tube, a seventh end fitting secured to ends of the seventh and eighth plurality of tape strips at one end of the fourth tube, and an eighth end fitting secured to ends of the seventh and eighth plurality of tape strips at an opposite end of the fourth tube, wherein the first end fitting and the seventh end fitting are coupled together so that the first and fourth tube elements extend along a common direction, wherein the seventh end fitting includes a first ring and comprising a cup member, where the ends of the seventh and eighth tape strips are secured to the first ring, the fifth end fitting includes a second ring and first opposing tabs extending therefrom, where the ends of the fifth and sixth tape strips are secured to the second ring, the third end fitting includes a third ring and second opposing tabs extending therefrom, where the ends of the third and fourth tape strips are secured to the third ring, and the first end fitting includes a fourth ring, a plurality of spaced apart flexible tangs concentric therewith and extending from the fourth ring and first and second tabs extending from the fourth ring 90° apart and perpendicular to the tangs, where the ends of the first and second tape strips are secured to the fourth ring, and wherein the plurality of flexible tangs are positioned within the cup member, the first tab is positioned between the first opposing tabs and secured thereto and the second tab is positioned between the second opposing tabs and secured thereto.

15. The support structure according to claim 14 further comprising a plurality of spaced apart straight tape strips extending along the length of each tube element and having ends secured to both of the respective end fittings of a respective tube element, said straight tape strips crossing the locations where the other tape strips cross in the respective tube element cross.

16. The support structure according to claim 15 wherein the plurality of tape strips in a respective tube element that are wound in the same direction is three tape strips spaced 120° apart and the three straight tape strips in a respective tube element are spaced 120° apart.

17. The support structure according to claim 14 wherein all of the tape strips are made of a thermoplastic matrix including glass or carbon fibers.

\* \* \* \* \*